DIVERSITY COMBINERS

Original Filed April 2, 1963

INVENTOR
PETER ROBINSON
BY Carole M. Calman
ATTORNEY

INVENTOR
PETER ROBINSON
BY Carole M. Calnan
ATTORNEY

INVENTOR
PETER ROBINSON
BY Carl M. Calman
ATTORNEY

United States Patent Office 3,305,781

Patented Feb. 21, 1967

3,305,781

DIVERSITY COMBINERS

Peter Robinson, Needham Heights, Mass., assignor to Raytheon Company, Lexington, Mass., a corporation of Delaware Original application Apr. 2, 1963, Ser. No. 269,936. Divided and this application Sept. 9, 1966, Ser. No. 578,399

5 Claims. (Cl. 325—305)

This is a divisional of copending application, Serial No. 269,936, filed April 2, 1963.

The present invention relates to diversity receiving systems of the kind comprising two or more receivers whose outputs are combined to provide a single output and more particularly to combining devices which provide an output signal having the best possible signal-to-noise ratio.

Diversity operation is being increasingly applied to radio and microwave links to combat fading and improve system reliability in the event of equipment failure. The signal is carried by two or more paths using different radio frequencies or antenna positions, thus making available at the receiver outputs two signals which are closely similar but accompanied by different noise powers resulting from different propagation conditions.

Two of the methods in most general use today for combining diversity signals to produce a single output signal utilize the maximal ratio principle and the selection diversity principle.

Maximal ratio principle combiners combine two or more available signals in optimum proportions to produce an output having the best possible signal-to-noise ratio. A larger contribution to the output is made by the signal having the better signal-to-noise ratio. Such combiners have previously employed vacuum tubes often by paralleling the outputs of two cathode followers stages, the output impedances of which are varied in accordance with the noise sampled from each signal path. The performance of combiners of this type is limited by tube capacitances which determine the maximum attenuation attainable and the upper limit of the working frequency band.

Selection diversity technique systems have generally utilized an electronic equivalent of a changeover switch to connect an output point to one or the other of the two available signals. In the simplest scheme, the switch is operated whenever the noise exceeds some predetermined value in the channel to which the output is connected at the time. An alternative arrangement compares the noise levels in the two available channels and operates the switch so that the output point is always connected to the channel having the lower noise. Diversity switches can be made to handle wide-band signals including TV video, but they are not capable of providing the full signal-to-noise improvement that can be obtained with a maximum ratio type combiner. They also tend to cause transient disturbances on the output sigal which are a source of trouble to the entire system.

It is therefore an object of the present invention to provide a new and improved diversity combiner system having wide-band characteristics, increased maximum attenuation characteristics, and with improved reliability.

It is an additional objective of the invention to provide a diversity combiner which utilizes solid state devices in a maximal ratio combiner for combining a plurality of signals in optimum proportions.

It is a further objective to provide a quasi maximal ratio diversity combiner using modified selection diversity principles to provide a close aproximation in performance to a maximal ratio type system.

In accordance with this invention, a device for combining a plurality of signals obtained from different signal paths to produce an output signal having a high signal-to-noise ratio is provided wherein the signals from each path are combined in optimum proportions in accordance with the amount of noise sampled free of signal power from each path.

In the preferred embodiment, two input signals are each separately applied through one of a pair of nonlinear impedance diodes to a common point from which is fed an output amplifier having a high input impedance. The diodes have an impedance characteristic which varies inversely with D.C. bias current. A bias current flows through each diode from a direct current supply. A control current from a difference amplifier also flows through each nonlinear impedance diode, adding to the bias current in one diode and opposing it in the other. Hence, the ratio of the impedances of the diodes will vary in accordance with the magnitude and sign of the control current. If the applied signal voltages are the same in magnitude and phase and the impedance of the amplifier input is high, the signal output remains constant when the impedance ratio changes. Noise powers applied at the input, however, are not equal or phase coherent and hence the impedance ratio can be adjusted for minimum noise output.

To do this automatically a control signal is produced which is a function of the ratio of the noise powers at the two inputs. Noise samples, free of signal power, are taken by a pair of bandpass filters from each input and applied to an amplifier and rectifier having a logarithmic transfer characteristic from noise input to direct current output. The two direct current outputs resulting are fed to a difference amplifier which produces a control current proportional to the difference of the logarithms of the noise powers, and which is also proportional to the logarithms of the ratio of the noise powers. The control current thus produced varies the biasing current flowing through each of the diodes and thus varies each diode's impedance to combine the signal voltages in accordance with the noise power content of each signal. It would also be possible to obtain the control signals from an automatic gain control circuit of a receiver in each of the signal paths instead of deriving them from noise samples.

In another embodiment a quasi maximal combiner is provided as an additional embodiment for use in situations requiring a close approximation only to the results obtained with maximal combining techniques. In particular, a first input signal is provided to a first normally closed switch and a second input signal is provided to a second normally closed switch. These two signals flowing through these normally closed switches are then summed by a high input impedance amplifier. Noise samples free of signal power are obtained by bandpass filters. The noise samples are then compared to provide a control signal when the magnitude of the noise signals are separated by a predetermined amount. The control signal is then used to open the switch coupled to the input signal containing the larger amount of noise, thereby preventing the noisier signal from being combined with the less noisy signal.

For a better understanding of the present invention together with other and further objects thereof, reference is had to the following description taken in connection with the accompanying drawings and its scope will be pointed out in the appended claims:

Figure 1:
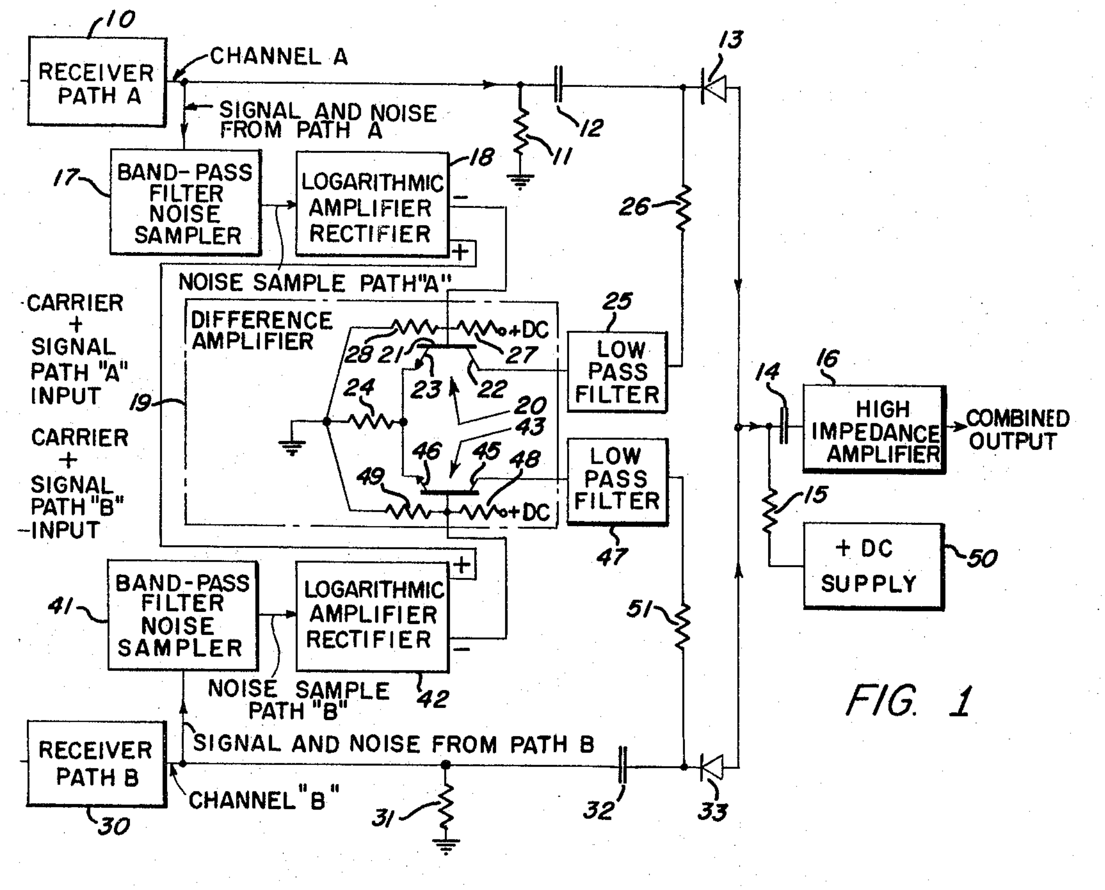
FIG. 1 is a maximal ratio combiner in block schematic form utilizing two variable impedance devices such as diodes.
Figures 3, 6:
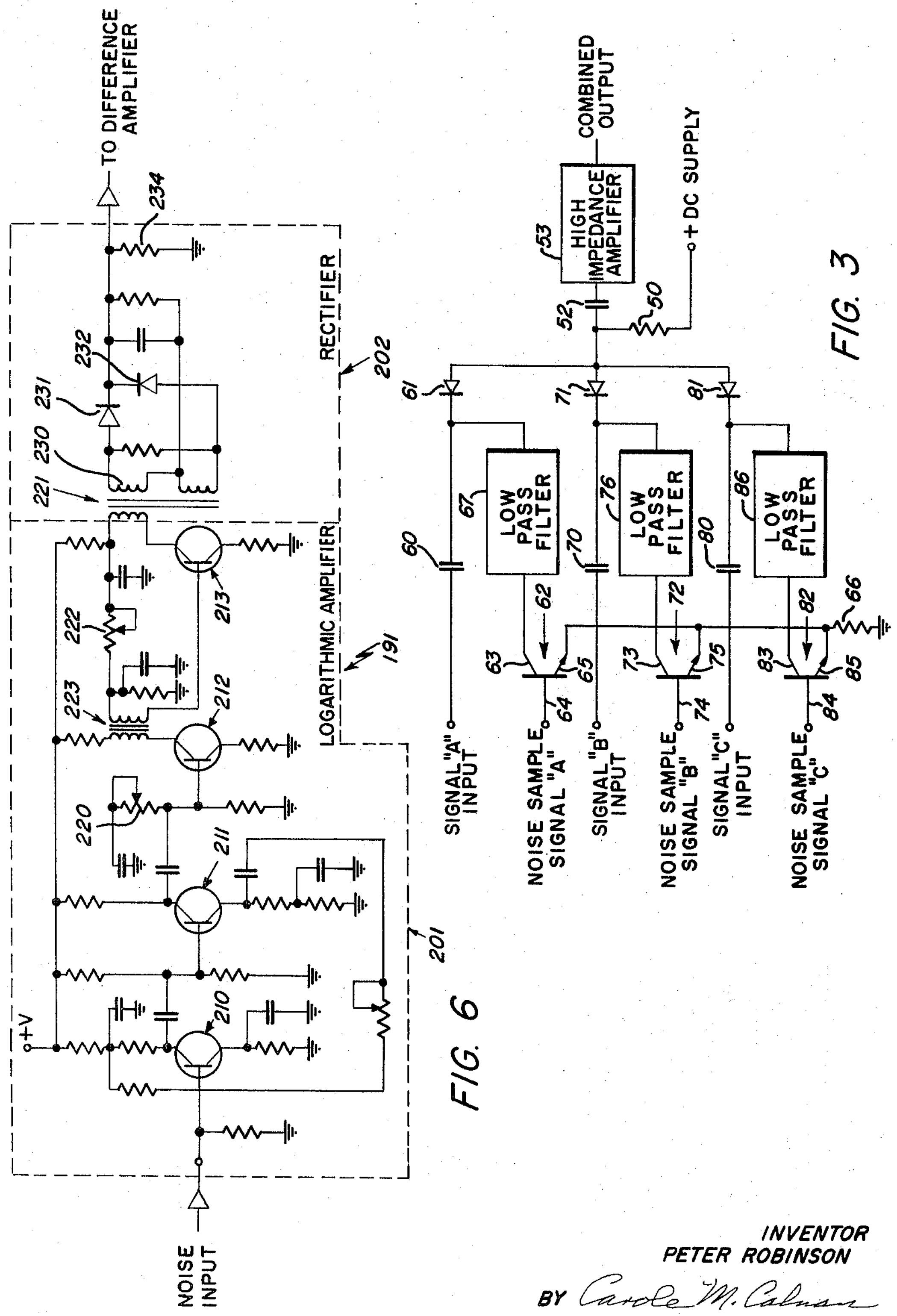
FIG. 3 is a maximal ratio combiner in schematic form suitable for combining three or more signals.
FIG. 6 is a circuit diagram of the logarithmic amplifier-rectifiers of FIGS. 1 and 4.

Referring particularly to FIG. 1, a maximal type combiner is shown for combining signals received over two signal paths such as paths A and B. A receiver 10 for detecting electromagnetic energy over signal path A provides on channel A an output signal A having an information content represented by a band of frequencies, and also some noise. Receiver 10 is sufficiently wide-band to permit some noise energy above or below the information frequencies of signal A to also appear on channel A. Since this noise energy is free of signal A, it is therefore possible to obtain a noise sample from channel A representative of the noise encountered over path A by signal A. Signal A is transmitted and provided across a load resistor 11 and through an isolating input capacitor 12 to a non-linear two-terminal impedance device 13, such as a diode (which in this case could be a commercially available square law 1N198 diode. Diode 13 has an impedance characteristic which varies inversely with D.C. biasing current flowing through it. Diode 13 acts on signal A provided by receiver 10 to alter the amount of signal from path A which will be provided to a high input impedance output amplifier 16 through input capacitor 14. A bandpass filter noise sampler 17 samples, from channel A in this instance, above and adjacent to the information band of frequencies present in signal A to provide a noise sample representative of and proportional to the noise power present in the information band of frequencies of signal A. This proportional noise sample is then provided to a logarithmic amplifier-rectifier 18. Logarithmic amplifier-rectifier 18 provides a D.C. output signal in conformance with the curve of FIG. 2 to a difference amplifier 19. This D.C. signal is therefore proportional to the logarithm of the noise sampled from channel A. A circuit which could be used as a logarithmic amplifier-rectifier 18 is shown in FIG. 6 and will be described at a later time.

A second receiver 30 also receives a signal B from path B and provides this signal as described with relation to receiver 10 of path A to a load resistor 31 and through an input capacitor 32 to a second two-terminal non-linear impedance device 33. Device 33 could also be, and in this instance is, a diode which is similar to and operates like diode 13 described above. Diode 33 acts on signal B and alters the amount of signal B passing through it in accordance with the diode's impedance prior to signal B being provided to amplifier 16 through input capacitor 14.

Bandpass filter noise sampler 41 is also shown coupled to the channel B output of receiver 30 to obtain a noise sample proportional to the noise contained within signal B, similarly as described with relation to bandpass filters 17, noted above. This noise sample from channel B, in this instance also taken above and adjacent to the information band of frequencies of signal B, is provided to a second logarithmic amplifier-rectifier 42 which generates a D.C. output voltage which is proportional to the logarithm of the sampled noise power provided by the bandpass filter 41.

Logarithmic amplifier-rectifier 18 and logarithmic amplifier-rectifier 42 are coupled together at their positive terminals. The negative terminal of logarithmic amplifier-rectifier 18 is provided to one input of a difference amplifier 19 and the negative terminal of logarithmic amplifier-rectifier 42 is provided to another input of difference amplifier 19. The difference amplifier 19 is utilized to provide control signals to alter the impedance of diodes 13 and 33 in accordance with the difference between the magnitude of the D.C. signals provided from logarithmic amplifier-rectifiers 18 and 42, said signals each representing the noise power content contained within signals A and B. Difference amplifier 19 comprises a first NPN transistor 20 having a base 21, a collector 22 and an emitter 23. Base 21 is coupled to the negative terminal of logarithmic amplifier-rectifier 18 and is biased in the "on" condition by the divider resistor 27 which is coupled to a D.C. supply and a second divider resistor 28 coupled to ground. Emitter 23 and emitter 46 are coupled to a high resistance 24 which causes the sum of the current in transistors 20 and 43 to be substantially constant regardless of small changes in voltages applied to the bases of the transistors in difference amplifier 19. Collector 22 is coupled through a low pass filter 25 and through a signal decoupling resistor 26 to the junction of diode 13 and capacitor 12. Low pass filter 25 provides isolation of the noise from logarithmic amplifier-rectifier 18 from the signal A circuit through diode 13. A D.C. voltage supply 50 is provided through a resistor 15 and through diode 13 via resistor 26 and low pass filter 25, and thus provides a collector voltage for collector 22. Thus, in the absence of an output signal from logarithmic amplifier-rectifier 18, transistor 20 will be conducting due to the biasing of its base 21 and a current will flow from D.C. supply 50 through resistor 15, through diode 13, through low pass filter 25, through transistor 20 and through resistors 24 to ground.

A second transistor 43 of difference amplifier 19 is shown having a base 44, a collector 45 and an emitter 46. The base 44 is shown connected to the negative terminal of logarithmic amplifier-rectifier 42 and is normally biased in the "on" condition by biasing resistors 48 and 49, resistor 51 being connected to a D.C. supply and biasing resistor 49 being connected between the base 44 and ground. Emitter 46 is coupled to the junction of emitter 23 of transistor 20 and resistance 24. Collector 45 is coupled through a low pass filter 47 which functions similarly as described with relation to low pass filter 25. Low pass filter 47 is coupled through a biasing resistor 48 to the junction of capacitor 32 and diode 33. In the absence of a signal at the negative terminal of logarithmic amplifier-rectifier 42, transistor 43 will be conducting due to the biasing of its base 44 and a signal will flow from D.C. supply 50 through resistor 15, through diode 33, through resistor 51, through low pass filter 47, through transistor 43 and through resistance 24 to ground. Inasmuch as both transistors 20 and 43 are connected as shown in FIG. 1, each transistor having approximately the same impedance, the current flowing through both transistors will be approximately equal and will sum through resistance 24.

Under normal conditions, it is assumed that there is no substantial difference in noise power sampled from channels A and B, diodes 13 and 33 will have equal currents flowing through them and therefore the signals A and B will combine in equal proportions at the input of amplifier 16. Now assume that the noise detected from channel A becomes greater than the noise which is detected from channel B, then logarithmic amplifier-rectifier 18 in conformance with the curve of FIG. 2, will produce an increased negative D.C. bias at the base 21 of transistor 20 and thus produced a decreased current flow through transistor 20. Since the difference amplifier 19 has been adapted by the use of large resistance 24 to provide a constant current sum regardless of small changes in the voltage applied to bases 21 and 44 of transistors 20 and 43, respectively, an increased D.C. current will then flow through transistor 43. This decreased current flowing through transistor 20 will, because of the series combination of collector 22, low pass filter 25, biasing resistor 26, diode 13 and bias resistor 15, decrease the amount of D.C. biasing current passing through diode 13. Since the impedance of diode 13 increases with decreasing current flow, a greater impedance will be encountered by the signal A and thus a reduced amount of signal A will reach and be combined at the input of amplifier 16. Additionally, since an increased current flow will pass through diode 33, an increased amount of signal B will pass through diode 33 and be combined at the input of amplifier 16 inasmuch as diode 33's impedance has decreased due to this increase in bias current flow. In this manner, it is thus seen that the flow of signals A and B through diodes 13 and 33 is controlled in accordance with the difference between noise samples proportional to the noise content contained within signals A and B. Furthermore, since logarithmic amplifiers are used in this particular case, the difference of their two output voltages is proportional to the logarithm of the ratio of the noise voltages present in the two channels. This difference voltage, when used to control combining diodes having an impedance approximately inversely proportional to current, results in a combiner that closely follows ideal ratio squared action over a large range of noise levels in the two incoming channels.

FIG. 3 illustrates a maximal ratio type combiner in schematic form particularly suitable for use where signals from more than two paths are required to be combined. A signal A is provided through an input capacitor 60 to a diode 61 before it is fed by way of an isolating capacitor 52 to a high impedance amplifier 53. Diode 61 is the same type of diode as described with relation to diodes 13 and 33 of FIG. 1. A noise sample representative and proportional to the noise power contained within signal A is obtained either in the manner shown in FIG. 1 or from automatic gain control circuits from a receiver and is provided to an input circuit comprising a first NPN transistor 62 having a base 64. Collector 63 of transistor 62 is shown connected through a low pass filter 67 to the junction of capacitor 60 and diode 61 and emitter 65 of transistor 62 is shown connected through a high resistance 66 to ground. Transistor 62 is utilized to control the flow of D.C. biasing current provided through diode 61 by the combination of the D.C. supply and the signal decoupling resistor 50, thereby providing means for altering the A.C. impedance presented to signal A in accordance with the magnitude of the noise sample presented to transistor 62. With an increase in noise in signal A the biasing current flowing through diode 61 decreases and therefore produces an increase in A.C. impedance which reduces the amount of signal A which is able to be transmitted to the high input impedance amplifier 53. The amount of signal B being transmitted to the high impedance amplifier 53 is controlled in the same manner as described with relation to signal A above, by a noise sample controlling a transistor 72 via its base 74, thus changing the biasing current flow through the diode 71, low pass filter 76, a collector 73 of transistor 72, an emitter 75 of transistor 72 and the resistance 66. Thus, the amount of signal B is also controlled and permitted to be combined with regard to the amount and magnitude of the noise sampled which is proportional to the noise power present in signal B.

There is also shown a third signal C which is forwarded through an input capacitor 80, through a diode 81 and through the isolating capacitor 52 to the high input impedance amplifier 53. A noise sample representative of the noise power present in signal C, obtained in a manner as described above, is applied to a base 84 of a transistor 82 to control the amount of biasing current passing through diode 81, a low pass filter 86, a collector 83 of transistor 82, emitter 85 of transistor 82 and the resistance 66. Resistance 66 is in this instance made sufficiently large to cause a constant current to flow through the combination of transistors 62, 72, and 82 regardless of changes in voltages applied to the bases of these transistors.

Since the circuit comprising transistors 62, 72 and 82 are connected at their emitters 65, 75 and 85 to the resistance 66, current will flow through each of these transistors in equal proportions under substantially equal noise present in signals A, B and C. Different or unequal currents will flow through these transistors when there are differences in the noise powers sampled adjacent to signals A, B and C, respectively. In this manner, the impedances of the diodes 61, 71 and 81 are controlled to provide a ratio square type combiner which operates on a plurality of information channels to provide a highly reliable wide-band diversity combiner particularly suitable for more than two paths combining, such as is required in telemetry systems.

Figure 4:
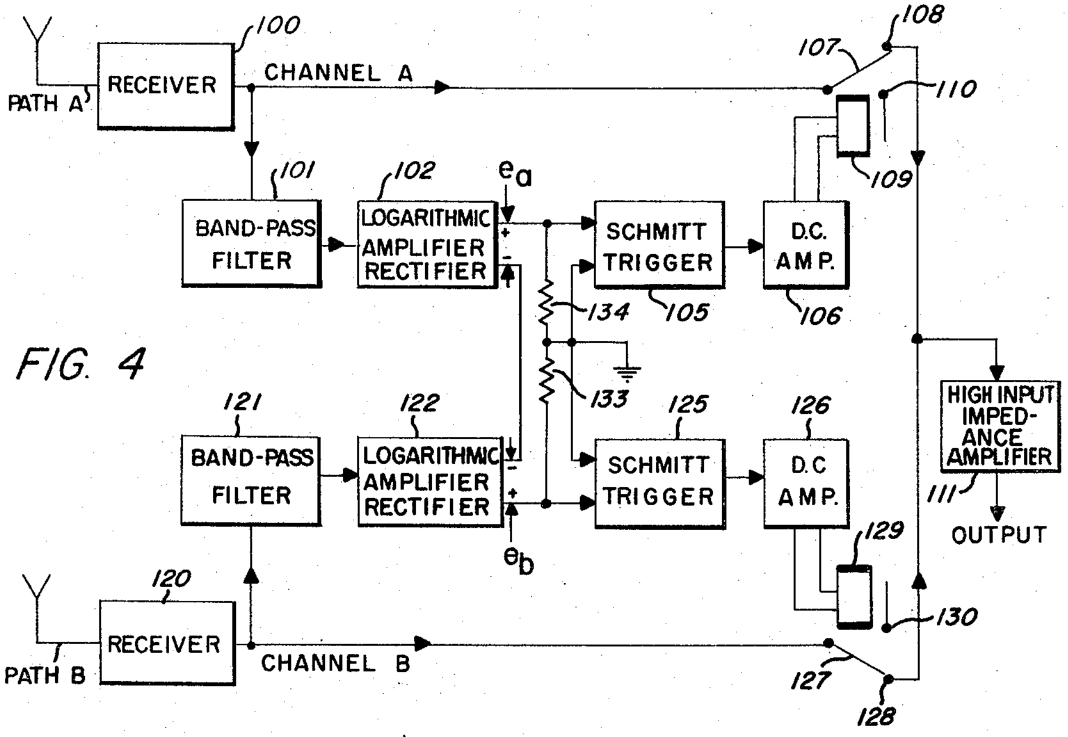
FIG. 4 is a block schematic diagram showing a quasi maximal combiner which provides an output signal having a signal-to-noise ratio approaching that of a maximal ratio combiner.

FIG. 4 illustrates a quasi maximal combiner which is useful in situations requiring a close approximation only to the results obtained with maximal combining techniques. A receiver 100 provides a signal A on its channel A output. Signal A is transmitted through a normally closed relay arm 107 of a relay 109 and through contact 108 of relay 109 to a high impedance amplifier 111. A bandpass filter 101 and a logarithmic amplifier-rectifier 102 is shown which functions in the same manner as described in relation to FIG. 1. Bandpass filter 101 samples noise on channel A free of signal A which is then operated on by logarithmic amplifier-rectifier 102 to provide a voltage $e_a$ at its two output terminals. The use of this voltage will be described at a later time. A second receiver 120 for path B is shown for receiving a signal B which has traveled over path B. Signal A and signal B have both come from a single source and contain substantially the same information content within both signal A and signal B. Signal B is transmitted through a normally closed arm 127 of a relay 129 and through a contact 128 of a relay 129 to the high impedance amplifier 111. There is also shown a bandpass filter 121 and a logarithmic amplifier-rectifier 122 for providing an output voltage $e_b$ across the output terminals of the logarithmic amplifier-rectifier 122 in the same manner as described with relation to the combination of the bandpass filter 101 and the logarithmic amplifier-rectifier 102 of FIG. 4.

Negative terminals of the logarithmic amplifier-rectifiers 102 and 122 are coupled directly together. The positive terminals of logarithmic amplifier-rectifiers 102 and 122 are coupled across a divided network comprising resistors 133 and 134, the junction of resistors 133 and 134 being coupled to ground. The divider network provides a signal across its terminals to trigger either of two Schmitt type triggering devices 105 or 125 depending upon the difference between voltages $e_a$ and $e_b$. Schmitt triggers 105 and 125 could be of the type shown on page 468, FIG. 20 of the book "Reference Data for Radio Engineers," 4th edition, published by the International Telephone and Telegraph Corporation. Schmitt trigger 105 provides an output control signal when voltage $e_a$ is greater than the voltage $e_b$ by a predetermined amount. Schmitt trigger 125 provides an output control signal when $e_b$ is greater than $e_a$ by a predetermined amount.

Figure 5:
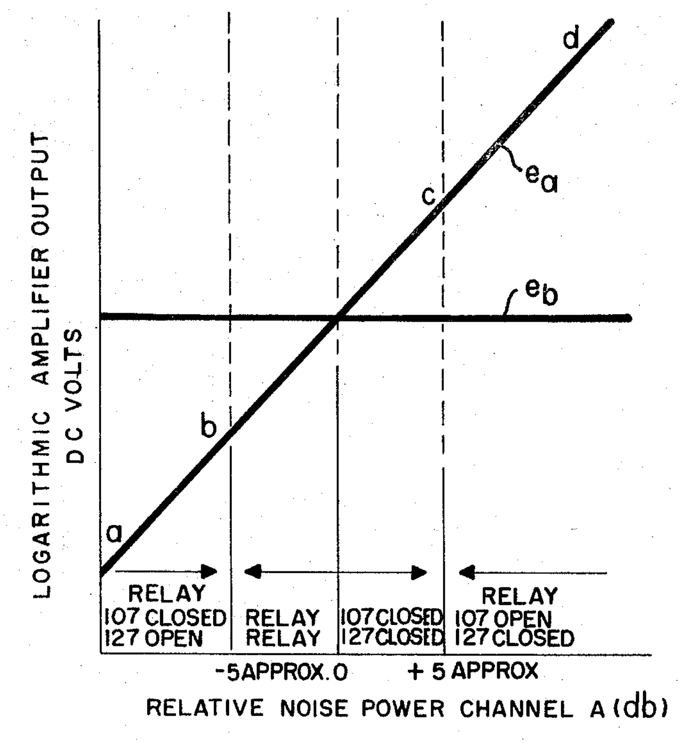
FIG. 5 is representative of a curve showing the sequential operation of the relay arms of FIG. 4.

These two output control signals are then provided to D.C. amplifiers 106 and 126, respectively, to provide a means for opening either arm 107 of relay 109 or arm 127 of relay 129 depending upon the relative magnitudes of $e_a$ and $e_b$ with respect to each other. For purposes of explanation and referring to FIG. 5, assume that voltage $e_b$ which is representative of the noise power content contained within signal B is held constant. Furthermore, assume that the voltage $e_a$ which is also representative of the noise power content of signal A is varying as shown in FIG. 5. When voltage $e_a$ is less than voltage $e_b$ by a predetermined amount, that is from points *a* to *b* on the graph of FIG. 5, relay 129 will open arm 127 to relay contact 130 to prevent signal B which has a greater noise content in comparison with signal A from being combined at the input to high impedance amplifier 111. Assume now that the voltage $e_a$ increases due to an increase in the noise power content of signal A, then the divider network will no longer provide a sufficient difference voltage to trigger Schmitt trigger 105 to keep relay 129 energized. Therefore, arm 127 will return to its normally closed condition which is represented by points *b* and *c* in the graph of FIG. 5, and both signals A and B will be combined at the input of amplifier 111. Now assume that voltage $e_a$ continues to increase due to a further increase in the noise power content of signal A, a voltage will then be provided to Schmitt trigger 105 to trigger Schmitt trigger 105 and provide an output control signal to D.C. amplifier 106. D.C. amplifier 106 will then energize relay 109 to open arm 107 to contact 110. This is represented by the points designated as *c* and *d* in the graph of FIG. 5. Thus, signal A due to an increase in noise which produced a voltage $e_a$ which was greater by a predetermined magnitude with regard to the voltage $e_b$ will prevent signal A from being combined with signal B at the input of amplifier 111. In this manner, a quasi maximal combiner is provided which provides a single output signal having a signal-to-noise ratio that closely approximates that obtainable using maximal ratio combining techniques.

Figure 2:
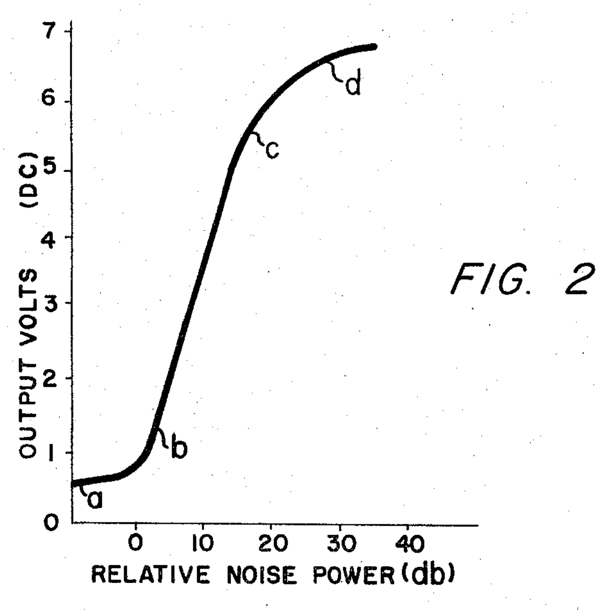
FIG. 2 is a curve representing the output from a logarithmic amplifier-rectifier of FIG. 1 versus the relative input noise power applied to the combination.

Referring now to FIG. 6, there is shown a circuit diagram of a typical logarithmic amplifier-rectifier suitable for use as the logarithmic amplifier-rectifiers 18 and 32 of FIG. 1 and the logarithmic amplifier-rectifiers 102 and 122 of FIG. 4. The logarithmic amplifier-rectifier 199 of FIG. 6 is shown in schematic form and comprises a logarithmic amplifier unit 201 in combination with a full wave rectifier 202. The logarithmic amplifier 201 acts on a noise input signal which could be provided by a bandpass noise sampler filter which is described in FIG. 1 and produces output voltage which is proportional to the logarithm of the noise voltage input. The full wave rectifier 202 acts on the noise output from the logarithmic amplifier 201 to convert this to an off ground D.C. potential representative of the amount of noise input. This D.C. signal is then applied to a difference amplifier as described with relation to FIG. 1. FIG. 2 is representative of a curve showing the variation in output voltage versus the magnitude of the sampled input noise applied to the logarithmic amplifier-rectifier of FIG. 6.

The logarithmic amplifier 201 comprises a plurality of transistors 210, 211, 212 and 213. The first two transistors 210 and 211 act as a feedback gain stabilized preamplifier which saturates only at high input noise levels and thus contributes to the logarithmic amplifier characteristic representative of the points *c* to *d* on the curve of FIG. 2. The third transistor 212 is operated near cutoff and is the main contributor to the logarithmic characteristic shown between points *a* to *c* in the curve of FIG. 2. A variable resistor 220 is used to adjust the operating point of transistor 212 to control the characteristic of the logarithmic amplifier between points *a* and *c*. A transformer 221 couples the output signal from transistor 212 to the base of transistor 213. A variable resistor 222 is used to adjust the operating point of transistor 213. Transformer 221 in conformance with transistor 214 tends to saturate at relatively high noise level input signal levels and aid in producing the logarithmic character of FIG. 2 points *b* and *c*.

The full wave rectifier 202 is comprised of a secondary winding 230 of transformer 221 along with a pair of diodes 231 and 232 which provide an output signal across a load resistor 234. A full wave rectifier is used in order to reduce the noise output of the rectifier 202.

Other embodiments of the invention could include PNP transistors instead of NPN transistors in the difference and logarithmic amplifiers and rectifiers. Additionally, it would be possible to use any other two-terminal nonlinear devices such as vacuum tube diodes in place of the diodes shown in FIG. 1 and the relays shown in FIG. 4. Additionally, it would be possible to obtain control voltages from an automatic gain control circuit of a receiver in order to provide control signals related to the noise contained in each of the input signals. Furthermore, other more complicated difference type circuits could be utilized such as digital techniques for providing a control signal to proportionally combine the input signals. Accordingly, it is desired that this invention not be limited, except as defined by the appended claims.

What is claimed is:

1. A system comprising first and second switches, means for providing a first input signal containing both noise and information to said first switch, means for providing a second input signal containing both noise and information to said second switch, means for normally maintaining said first and second switches in a closed condition, means for combining said first and second signals to provide a single output signal having improved signal-to-noise characteristics, means for sampling free of information a signal proportional to the noise contained within said first input signal, means for sampling free of information a signal proportional to the noise contained within said second input signal, means for comparing said proportional signals to provide a comparison signal when the magnitude of the noise contents of said first and second signals are separated by a predetermined amount, and means for opening the switch connected to the signal having the greater amount of noise responsive to the presence of said comparison signal.

2. In combination, a plurality of variable impedance switching devices, means for placing these devices in a low impedance condition, means for providing a different input signal containing substantially the same information content to each of said devices, means for combining said different input signals coupled to each of said devices, means for sampling a noise representative of the noise power content of each of said different input signals, means for comparing said sampled noise to provide a control signal when the magnitude of the noise powers are separated by a predetermined amount, and means for placing in a high impedance condition the switching device connected to the different input signal having the greater noise content by a predetermined amount with respect to another of said different input signals to inhibit this greater noise content input signal from being applied to the means for combining said different input signals.

3. A system comprising a plurality of means for receiving, means for providing a similar input signal to each of said means for receiving, each of said input signals having an information band of frequencies and a noise band of frequencies within said information band of frequencies, a plurality of low impedance path means, a plurality of means for applying a different one of each of said similar received input signals to a different one of each of said low impedance path means, means for combining said different received similar input signals to provide a single output signal, said means for combining coupled to each of said plurality of means for providing a low impedance path, means for sampling noise power content free of signal power representative of the noise content of each of said similar input signals, said sampling taking place either above or below the information band of frequencies contained within said similar input signals, means for comparing each of said sampled noise powers, means for providing a control signal when the magnitude of the sampled noise powers diverges in a predetermined degree, and means for selectively applying said control signal to each of said plurality of low impedance means to increase the impedance of said selected low impedance means to impede by a predetermined degree the input signal having the poorer signal-to-noise ratio in comparison with said other of said plurality of input signals.

4. A system for combining a plurality of signals representative of a single transmitted signal comprising a plurality of switching devices, each of said switching devices being normally in a low impedance condition, means for permitting one of a plurality of input signals to be applied to each of said switching devices, means for combining said input signals coupled to each of said switching devices, and means for placing selected switching devices in a high impedance condition in accordance with a comparison between a signal representative of the noise power contents of each of said input signals to selectively impede at least one of said input signals from being provided to said means for combining.

5. A system for combining a plurality of signals comprising a pair of switching devices, each of said switching devices being normally in a low impedance condition, means for providing a first input signal to one of said switching devices, means for providing a second input signal to the other of said switching devices, means for combining said first and second signals coupled to each of said switching devices, means for sampling noise power free of, but related to the noise power content of said first input signal, means for sampling noise power free of, but related to the noise power content of said second input signal, means for providing a first control signal which is proportional to the logarithm of the related noise power of said first input signal, means for providing a second control signal which is proportional to the logarithm of the related noise power of said second signal, means for comparing said first and second control signals to provide an output signal when the magnitude of the related noise powers are separated by a predetermined amount, and means for placing in a high impedance condition the switch connected to the input signal having the larger noise power content to inhibit said higher noise power content input signal from being combined at said means for combining.

No references cited.

KATHLEEN H. CLAFFY, *Primary Examiner.*

R. S. BELL, *Assistant Examiner.*